United States Patent
Bhimaraju et al.

(10) Patent No.: US 8,677,451 B1
(45) Date of Patent: Mar. 18, 2014

(54) ENABLING SEAMLESS ACCESS TO A DOMAIN OF AN ENTERPRISE

(75) Inventors: Madhu Bhimaraju, Irvine, CA (US); Syed Zaheeruddin, Irvine, CA (US)

(73) Assignee: Cellco Partnership, Basking Ridge, NJ (US)

( * ) Notice: Subject to any disclaimer, the term of this patent is extended or adjusted under 35 U.S.C. 154(b) by 330 days.

(21) Appl. No.: 12/820,774

(22) Filed: Jun. 22, 2010

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |

(52) U.S. Cl.
USPC ........................................ 726/2; 726/7; 726/8

(58) Field of Classification Search
USPC .................................................. 726/2, 7, 8
See application file for complete search history.

(56) References Cited

U.S. PATENT DOCUMENTS

| | | | |
|---|---|---|---|
| 6,895,439 B2 | 5/2005 | Isomaki et al. | |
| 7,302,254 B2 * | 11/2007 | Valloppillil | 455/414.1 |
| 7,484,241 B2 | 1/2009 | Challener et al. | |
| 7,496,953 B2 | 2/2009 | Andreev et al. | |
| 7,540,022 B2 | 5/2009 | Barari et al. | |
| 7,610,390 B2 | 10/2009 | Yared et al. | |
| 2003/0012382 A1 | 1/2003 | Ferchichi et al. | |
| 2003/0035408 A1 | 2/2003 | Hebert | |
| 2003/0039237 A1 | 2/2003 | Forslow | |
| 2003/0120593 A1 | 6/2003 | Bansal et al. | |
| 2003/0152232 A1 | 8/2003 | Pirila et al. | |
| 2003/0159068 A1 | 8/2003 | Halpin et al. | |
| 2003/0163733 A1 | 8/2003 | Barriga-Caceres et al. | |
| 2003/0193733 A1 | 10/2003 | Hakamata et al. | |
| 2004/0088186 A1 | 5/2004 | Anvekar et al. | |
| 2004/0137921 A1 * | 7/2004 | Valloppillil et al. | 455/466 |
| 2004/0225878 A1 | 11/2004 | Costa-Requena et al. | |
| 2005/0059397 A1 | 3/2005 | Zhao | |
| 2005/0060363 A1 | 3/2005 | Jang et al. | |
| 2005/0078824 A1 | 4/2005 | Malinen et al. | |
| 2005/0096048 A1 | 5/2005 | Clare et al. | |
| 2005/0102529 A1 | 5/2005 | Buddhikot et al. | |
| 2005/0113067 A1 | 5/2005 | Marcovici et al. | |
| 2005/0120221 A1 | 6/2005 | Arnold et al. | |
| 2007/0156826 A1 | 7/2007 | Lu | |
| 2007/0156827 A1 | 7/2007 | Lu | |
| 2007/0162555 A1 | 7/2007 | Lu | |

(Continued)

OTHER PUBLICATIONS

United States Court of Appeals for the Federal Circuit in Re Arnold G. Klein 2010-1411 Decided: Jun. 6, 2011.*
United States Office Action issued in U.S. Appl. No. 10/695,805, mailed Mar. 7, 2007.

(Continued)

*Primary Examiner* — Kambiz Zand
*Assistant Examiner* — Benjamin Kaplan (57) ABSTRACT

A user is allowed to access any of a number of domains associated with an enterprise using a credential for any one of the domains. An exemplary method includes steps of receiving, from a user and at a first domain of the enterprise, a user identification and a password; determining, at the first domain, whether the user identification is associated with the first domain; and upon determination that the user identification is not associated with the first domain, determining, at the first domain, whether the user identification is associated with a second domain of the enterprise. The user identification and the password are authenticated at the first domain, upon determination that the user identification is associated with the second domain. Upon successful authentication, the user is enabled to access the second domain of the enterprise. The user identification does not need to include a character directly reflecting a domain name.

27 Claims, 6 Drawing Sheets

(56) References Cited

U.S. PATENT DOCUMENTS

| | | |
|---|---|---|
| 2007/0162600 A1 | 7/2007 | Lu |
| 2008/0163335 A1* | 7/2008 | Hagstrom ............ 726/1 |
| 2009/0320114 A1* | 12/2009 | Guo et al. ............ 726/8 |
| 2011/0209202 A1* | 8/2011 | Otranen ............ 726/4 |

OTHER PUBLICATIONS

United States Office Action issued in U.S. Appl. No. 10/695,805, mailed Oct. 17, 2006.

United States Office Action issued in U.S. Appl. No. 10/695,805, mailed Aug. 12, 2005.

* cited by examiner

ENABLING SEAMLESS ACCESS TO A DOMAIN OF AN ENTERPRISE

TECHNICAL FIELD

This disclosure relates to a method and system for enabling a user to access domain associated with an enterprise through another domain associated with the enterprise. In particular, the method enables the user to access the one domain while providing user credentials associated with that domain to the other domain.

BACKGROUND

The convenience of performing many daily functions online has boosted the number of people using Internet. Today, Internet communication enables E-commerce, social networking, entertainment, etc. The self service functionality provided by Internet has not only benefited customers but also enterprises in cutting down expenses required for running operations requiring employment of various customer service personnel. The growth of enterprises into e-business networks is perhaps the most significant trend in the evolution of Internet commerce.

Some of large scale enterprises have achieved a very high level of coordination between their own information technology systems and those of their customers, suppliers and partners. In business-to-consumer environments, where end users communicate with a single enterprise that simultaneously presents products or services from multiple divisions and/or partners, access to shared resources should be secure and structured to meet the requirements of each entity in the relationship, while meeting end-users' needs at no additional end-user effort.

To enable a secure access, in most of architectures currently used in the industry, a customer has to identify and authenticate himself or herself independently by supplying a set of user credentials (e.g., a user identification and a password) applicable to each of the domains comprising a single enterprise. For example, the user may have a first set of credentials for accessing ABXZ.com; a second set of credentials for accessing ABXZ.net; and a third set of credentials for accessing ABXZWireless.com. These domains may belong to a single enterprise (multiple lines of business) or to multiple enterprises that have merged or signed up to trust and share their user credentials. For the sake of simplicity, in the rest of this document we assume the former case—a single enterprise with multiple lines of business.

With the increase in the number of Internet users and websites over the last two decades, online profile management has become a challenge for both the users and the businesses serving them. While the users are expected to remember distinct logins across distinct websites, the practical reality is that they often do not. In keeping with the previous example, the user may remember a set of credentials but may not know to which domains they belong. Therefore, the user may have to try the credential against an authentication server of each of the domains, until the user finds the domain corresponding to the credentials. This naturally creates a challenge for an enterprise in supporting their customers base. This structure can also make it difficult for an enterprise supporting multiple different domains each providing a different service to project themselves as a single entity.

There is need to address the foregoing challenges. In particular, there is a need to enable a customer to transition from one domain to another domain of an enterprise seamlessly with a user identification which the customer has registered with any of the domains of the enterprise and which does not include a character directly identifying a domain name. This approach give the customers freedom of choice—where all IDs are supported across all domains of the enterprise and the customer does not have to remember the matching domain for a particular set of credentials. This approach also enables the affiliated companies working separately under the same brand (e.g., ABXZ) to project themselves as a single entity. To illustrate, with this approach, a user who enters wireless log-in credentials in a ABXZ.com domain, will not be refused access and instead will be directed to the ABXZ Wireless.com domain.

SUMMARY

An exemplary method enables a user to access a plurality of domains associated with an enterprise. The method includes steps of receiving, from a user and at a first domain of the enterprise, a user identification and a password; determining, at the first domain, whether the user identification is associated with the first domain; and upon determination that the user identification is not associated with the first domain, determining, at the first domain, whether the user identification is associated with a second domain of the enterprise. The method further includes a step of authenticating, at the first domain, the user identification and the password upon determination that the user identification is associated with the second domain. Upon successful authentication, the user is enabled to access the second domain of the enterprise. The user identification does not include a character directly reflecting a domain name.

The above general aspect may include one or more of the following features. For example, the user identification may include a telephone number. The method may further include a step of accessing a unified profile at the first domain to identify a domain name associated with the user identification. The unified profile may include all the user identifications of the enterprise and their corresponding domains.

The method may further include a step of receiving, from the second domain, updates to the unified profile stored at the first domain. The updates may reflect changes to user identifications associated with the second domain. The updates to the unified profile may be automatically received from the second domain without an effort from the user. The method may further include a step of sharing the unified profile with the second domain. The method may further include steps of: receiving, from the user, a request to change a user identification associated with the first domain; requesting, from the user, a new user identification; receiving, in response to the request, the new user identification; determining whether the new user identification is registered at the first domain or the second domain; and upon determining that the new user identification is not registered at the first and second domains, registering the new user identification for the user.

The method may further include steps of: receiving, from the user, a request to change a user identification associated with the first domain; requesting, from the user, a new user identification; receiving, in response to the request, the new user identification; determining whether the new user identification is registered at the first domain or the second domain; and upon determining that the new user identification is registered at the first domain or the second domain, informing the user of to select another user identification. Determining whether the new user identification is registered at the first or second domains may include referencing a unified profile at the first domain to determine whether the new user identification is registered at the first or second domains. The method may further include a step of not authenticating the user to the first domain. Enabling the user to access the second domain may include redirecting the user from the first domain to the second domain seamlessly.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

At a broad level, this disclosure describes a technique allowing a user to enter credentials associated with a second domain of an enterprise in a first domain of an enterprise and be automatically logged in and redirected to the second domain seamlessly. That is, the user does not recognize that it has entered an invalid credential for a particular domain that it accessed. To the user, the result is the same regardless of which domain the user types in his/her credentials. Once the user gives his/her login credentials in any of the domains of the enterprise, the system would automatically take the user to the appropriate domain for which the user is registered.

In keeping with the previous example, assume that enterprise ABXZ has three domains associated with it: ABXZ.com, ABXZ.net, and ABXZWireless.com. Further assume that the user has a first set of credentials for accessing ABXZ.com; a second set of credentials for accessing ABXZ.net; and a third set of credentials for accessing ABXZWireless.com.

With the techniques disclosed herein, the user can give any of his/her login credentials to any of the domains, and the system would automatically determine which domain the credentials belong to; automatically log the user to the appropriate domain for which the user credential is registered; and redirect the user to the appropriate domain for which the user credential is registered. For example, if the user enters the first set of credentials for ABXZ.com website in the ABXZ.net website, the user will be authenticated locally (e.g., at the ABXZ.net) and automatically landed to the ABXZ.com website, where the ABXZ.com website takes further control of the user. To this end, each of the different domains of the enterprise share their corresponding users credentials with each other to enable seamless login across them.

The different domains may comprise a different business units of the enterprise. For example, one of the domains may offer one set of services/products to the user and the other domains may offer different kind of services/products to the user. To this end, the domains may be associated with different name/addresses and may comprise a different user interface from each other. In one example, the user interfaces of the domains do not convey to the user that they are associated with a single enterprise. In another example, the user interfaces of the domains convey to the user that they are associated with the single enterprise.

There are various techniques employed by different corporations to manage customer login information. Detailed below are some of the prominent techniques that were attempted. The following first describes some of these techniques before describing the technique of this disclosure in more detail.

Access Manager is one technique used by different corporations to manage customer login information. Access manager provides authentication of users to their respective accounts. There are multiple steps for a user to authenticate to their account. Once a user tries to access www.ABXZWireless.com, a policy agent installed on the web server may intercept the request and redirect the user to a login page. On this page the user provides a user identification and a password. At this point, Access Manager creates a session for the user for a specific lifetime depending on the policies defined. The user identification which may include a mobile number of a user or may be created by the user is validated against a repository holding the login information of the users of the ABXZWireless.com site.

If the Access Manager policies determine that the user has access to the requested application and the user credentials are valid the user is authenticated and can proceed. If, however, the Access Manager policies determine that the user information is incorrect or the user does not has access to the requested pages, then the user is redirected to a different page or shown a 'forbidden' page as defined in the policies. The user can stay logged on until the user's session expires or the user decides to log out.

Although Access Manager is a light weight authentication tool and provides a secure way of authenticating users, it is not a complete solution. The solution is limited to making sure that the users are granted access to their authorized resources in a quick and secure way. However the solution is restrained by the fact that it is restricted to a particular organization or a business unit within an organization. For example, in the case of ABXZ, there are three distinct business units: ABXZWireless.com (wireless), ABXZ.net (broadband) and ABXZ.com (telecom). In this case, if a user is affiliated with more than one business unit, the user will need to have distinct login accounts on all the individual sites. This is not a very user friendly solution because the user may have to remember different user identifications while dealing with separate business units of the same enterprise family.

The next advancement to Access Manager is Federation. This technology enables the user to be linked across various domains both within the organization and to authorized parties outside of the organization. As discussed in the above case, if users have multiple accounts (e.g., with both ABXZWireless.com and ABXZ.com), the user has to have distinct user identification on all of the systems. Federation provides the ability to link the accounts in a backend directory server. Though Federation enables a linking feature, the user has to initiate the linking. Once linking is successful, if the user signs onto one of their accounts they can navigate seamlessly to their other accounts without having to authenticate again. This provides a more user friendly experience in the sense that a user is just authenticated once. The users can be linked to different lines of business of their organization or even outside of their organization. The user identifications can also be federated with different application service providers and other partner companies—provided they use the same authentication protocols and the policies match across the different entities.

The Federation solution overcomes the challenges posed by the Access Manager solution. It provides the users a more unified experience while dealing with an enterprise having multiple lines of businesses each of which is associated with a different domain. It also gives the enterprise an opportunity to present itself as a consolidated/single enterprise. However, the challenge with the Federation solution is that a user still has to maintain multiple accounts on the different line of business of the organization, and this solution can not be extended beyond the single sing-on solution. Also, federation comes into effect only once a user has authenticated to either one of the site's. That is, the user has to remember the set of credentials and the corresponding domain for the credentials.

The solution discovered by the inventors is a unique step in consolidation of the user experience as part of the larger strategy to project a multi-unit/domain enterprise as one entity. It helps in providing many services and it overcomes the challenges posed by the Access Manager and Federation solutions. The present solution requires no effort from the end users. The end users may sign in with any of their registered identification (across different domains) in any of the websites associated with the enterprise.

To illustrate, the solution allows the user to enter credentials associated with a second domain of an enterprise in a first domain of the enterprise and be automatically logged in and redirected to the first domain seamlessly. That is, the user does not recognize that it has entered an invalid credential for a particular domain that it accessed. To the user, the result is the same regardless of which domain the user types in his/her credentials. Once the user gives his/her login credentials in any of the domains, the system would automatically take the user to the appropriate domain for which the user is registered for the entered credential(s).

This method benefits both users and enterprises. It can reduce complexity and offer an improved user experience when accessing enterprise services. For example, the users not directly administered by ABXZ.com would not be denied access when attempting to reach ABXZ.net through the ABXZ.com either intentionally or accidentally. In this sense, the process of trust establishment is fundamental to allow rapid and seamless interaction between different trust domains. This concept provides the enterprises an opportunity to share their products and services with a user who is not currently a customer of the other services of the enterprise.

In the above example, assuming user accounts in ABXZ.com and ABXZ.net are federated, there is a unified profile created for these federated user accounts. In this scenario, if the user tries to login with his ABXZ.net user credentials to ABXZ.com intentionally or accidentally, using the unified profile, the user will be authenticated to the ABXZ.com and taken to his ABXZ.com landing page. The user also will have the ability to seamlessly move to ABXZ.net account without further authentication. In case where user accounts in ABXZ.com and ABXZ.net are not federated with each other, if the user tries to login with his ABXZ.net user credentials to ABXZ.com intentionally or accidentally, using a unified profile, he will be authenticated at ABXZ.com and simply redirected to his ABXZ.net landing page. The user will not be able to seamless navigate to ABXZ.com.

Figure 1A:
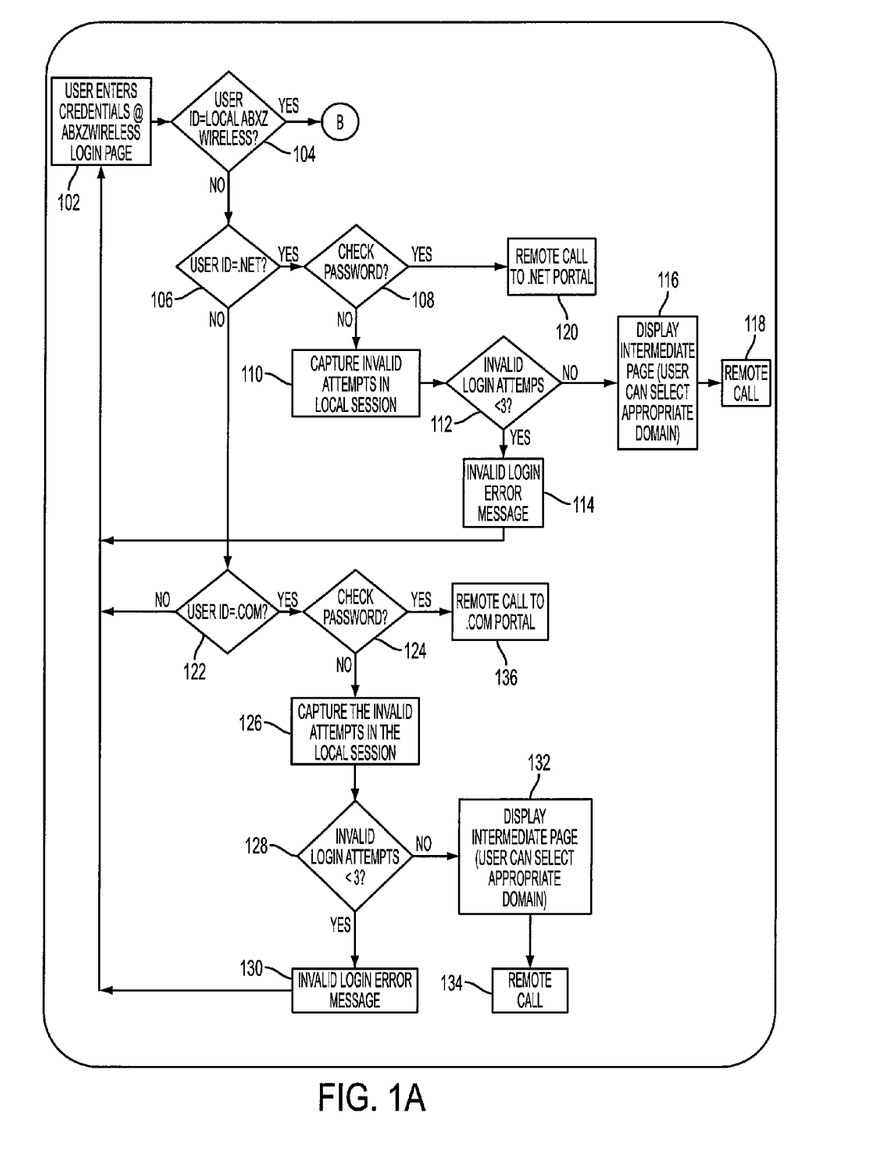
FIGS. 1A and 1B illustrate an exemplary process for allowing a user to access a plurality of domains of the enterprise using a credential associated with any one of the domains.
Figure 1B:
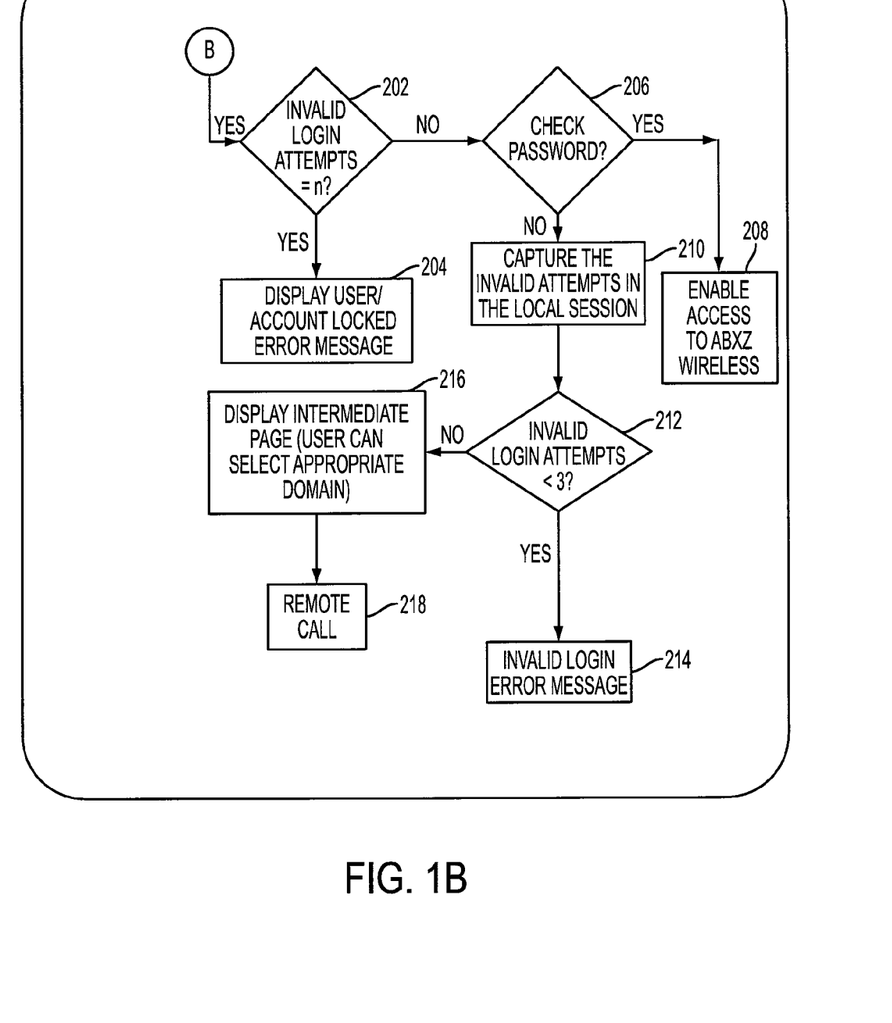

FIGS. 1A and 1B illustrate an exemplary process for allowing a user to access a plurality of domains of the enterprise using a credential associated with any one of the domains. The process begins with the user entering credentials in one of the domains of the enterprise (Step 102). In this specific example, the domain that is for the ABXZWireless.com domain. However, the domain can include other domains such as, for example, ABXZ.com or ABXZ.net. The credentials include a username and password. The username does not include a character reflecting a domain name. For example, if the username is associated with the ABXZWireless.com, it does not include a characters directly reflecting the ABXZ Wireless domain. For example, the user name includes the user's telephone number. Although the user's telephone number may map to the ABXZWireless, the number itself does not include a character reflecting such mapping.

Upon receiving the user's credentials, the domain determines whether the credentials are associated with the ABXZ Wireless domain (Step 104). The domain may include a database of its customers and their corresponding credentials. If there is a match, the domain authenticates the user and enables the user to access the resources offered by the local domain, shown in more detail with respect to FIG. 1B. For example, before authenticating the credentials, the process may check the number of invalid login attempts by the user (Step 202). If the number of invalid login attempts exceed a threshold "n" (Step 202, Yes), a user/account locked error message is displayed to the user (Step 204). If the number of invalid login attempts does not exceed the threshold "n" (Step 202, No), the domain checks to determine whether the credentials are valid (Step 206). If yes (Step 206, Yes), the domain authenticates the user and enables the user to access the resources offered by the ABXZ Wireless business unit (Step 208) via the domain that actually received the credentials.

If the domain determines that the credentials are not valid (Step 206, No), the domain captures the invalid attempts in the local session (Step 210). In one example, if the invalid login attempts are less than 3 (Step 212, Yes), the domain displays to the user an invalid login error message (Step 214). To this end, the user may make another attempt to log into the system. If the invalid login attempts are more than 3 (Step 212, No), the domain displays an intermediate page to the user for selecting an appropriate domain (Step 216). If the user selects a domain different from the local domain, the domain makes a remote call to the selected domain name (Step 218) and displays the web site associated with the selected domain to enable the user to log into that domain.

Referring again to FIG. 1A, if the domain determines that the user credentials (e.g., username) do not correspond to the local credentials (Step 104, No), the domain checks to determine whether the user credentials are associated with another domain of the enterprise. For example, the domain checks to determine whether the received user credentials are associated with ABXZ.net domain (Step 106). For example, the receiving domain may include or have access to a database having all the usernames of the enterprise and their corresponding domains. If the domain determines that the received username corresponds to the ABXZ.net domain (Step 106, Yes), the domain checks the user provided credentials to authenticate the user locally.

To enable local authentication of the credentials registered with another domain, the domain requires access to a unified profile repository. The unified profile repository may include one file for storing usernames and passwords associated with ABXZWireless.com; another file for storing usernames and passwords associated with ABXZ.com; and another file for storing usernames and passwords associated with ABXZ.net. The unified profile repository may also define the relationships between multiple user identifications of the user from the different domains of the enterprise are kept. The unified profile may provide a 360° view of customer profiles across different domains. This requires migration of the SSO federated customer from each domain to the unified profile data store with available unified profile data attributes as "Linked-Groups." These federated customers have seamless SSO navigation across the domain sites.

In one implementation, a copy or instance of the unified profile may be stored at a remote server accessible by all the domains. In another implementation, the unified profile may be stored at each of the domains. In either case, the unified profile is shared across all the domains, and all the domain sites will have read access to the unified profile. This process is described below in more detail with respect to FIG. 2.

Using the unified profile, the receiving domain determines whether the received credentials are valid. If the receiving domain determines that the credentials are not valid (Step 108, No), the domain captures the invalid attempts in the local session (Step 110). In one example, if the invalid login attempts are less than 3 (Step 112, Yes), the domain displays to the user an invalid login error message (Step 114). To this end, the user may make another attempt to log into the system. If the invalid login attempts are more than 3 (Step 112, No), the domain displays an intermediate page to the user for selecting an appropriate domain (Step 116). If the user selects a domain different from the local domain, the domain makes a remote call to the selected domain (Step 118) and displays the web site associated with that particular domain to enable the user to log into that domain.

If the credentials are valid (Step 108, Yes), the domain makes a remote call to the ABXZ.net domain and displays the ABXZ.net website to the user (Step 120). To this end, the user does not recognize that it has entered an invalid credential for a particular domain that it accessed. The result is the same regardless of which enterprise domain to which the user enters his/her credentials. Once the user gives his/her login credentials in any of the domains, the system would automatically authenticate the entered credentials and take the user to the appropriate domain for which the user is registered.

If the username does not correspond to the ABXZ.net domain (Step 106, No), the receiving domain checks to determine whether the username corresponds to the ABXZ.com domain (Step 122). If not (Step 122, no), the user is requested to reenter credential information. In this scenario, three domains were shown to be associated with the enterprise. However, one of ordinary skill recognizes that more or less domains may be associated with the enterprise. The system will check the credentials against each of the domains to validate the user.

If the receiving domain determines that the received username corresponds to the ABXZ.com domain (Step 122, Yes), the domain checks the user provided credentials to authenticate the user (Step 124) in a manner similar to the authentication of credentials associated with the ABXZ.net domain in Step 108. If the domain determines that the credentials are not valid (Step 124, No), the domain captures the invalid attempts in the local session (Step 126). In one example, if the invalid login attempts are less than 3 (Step 128, Yes), the domain displays to the user an invalid login error message to the user (Step 130). To this end, the user may make another attempt to log into the system. If the invalid login attempts are more than 3 (Step 128, No), the domain displays an intermediate page to the user for selecting an appropriate domain (Step 132). If the user selects a domain different from the local domain, the domain makes a remote call to the selected domain name (Step 134) and displays the web site associated with the selected domain to enable the user to log into that domain.

If the credentials are valid (Step 124, Yes), the domain makes a remote call to the ABXZ.com domain and displays the ABXZ.com website to the user (Step 136). Again, the user does not recognize that it has entered an invalid credential for a particular domain that it accessed. Once the user gives his/her login credentials in any of the domains, the system would automatically authenticate the user for the appropriate domain and take the user to the appropriate domain for which the user is registered.

As noted above, to support seamless access according to the technique described in this disclosure, each domain may require access to a copy of other domains credentials (e.g., username, password, alias, user-status, etc.). The native Master-Consumer Fractional Replication of Sun Directory Server may be used to replicate the credentials between domains of the enterprise.

Figure 2:
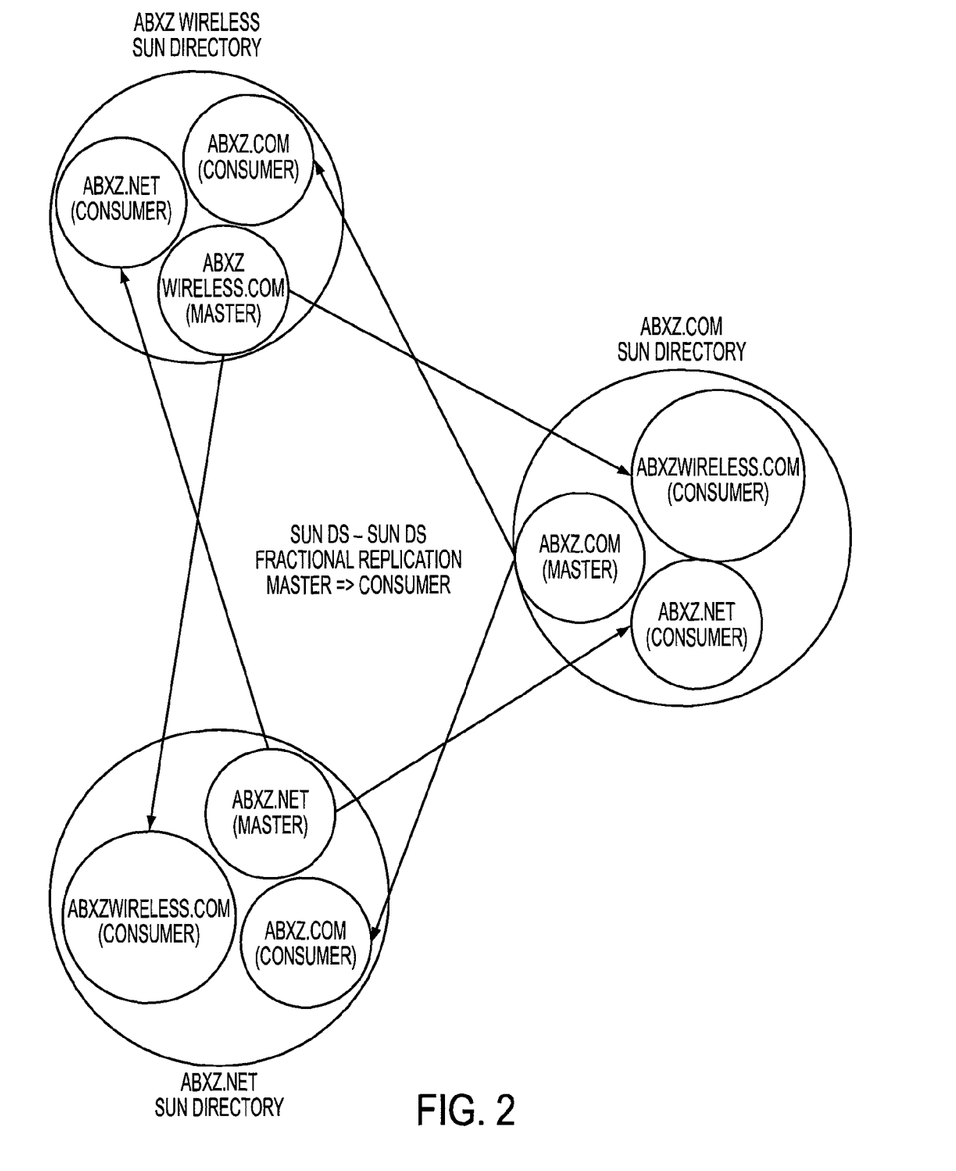
FIG. 2 illustrates a replication data flow diagram between the ABXZ 'circle-of-trust' partners: ABXZWireless.com, ABXZ.com, and ABXZ.net in accordance with the Master Consumer Fractional Replication of Sun Directory Server.

FIG. 2 illustrates a replication data flow diagram between the ABXZ 'circle-of-trust' partners: ABXZWireless.com, ABXZ.com, and ABXZ.net in accordance with the Master Consumer Fractional Replication of Sun Directory Server. In this solution, each domain shares a fractional subset of their customers profiles with the other domains to enable seamless login of the user. This process may be performed automatically and without a request or an effort from the user. In the fractional replication topology, data flows one way from the masters (owners of the data) to consumers (read only). As shown, the ABXZWireless.com is the master of user identification data associated with the ABXZWireless domain and the consumer of the user identification data associated with the ABXZ.com and ABXZ.net. Similarly, the ABXZ.com is the master of user identification data associated with the ABXZ.com domain and the consumer of the user identification data associated with the ABXZWireless.com and ABXZ.net. Similarly, the ABXZ.net is the master of user identification data associated with the ABXZ.net domain and the consumer of the user identification data associated with the ABXZWireless.com and ABXZ.com.

Though these replication channels are opened up, the updates to the customer profiles may be strictly controlled by the individual domains. The data shared across the domains may be purely 'read-only' copies in the consumers. For example, ABXZWireless.com customer's password may be updated by ABXZ Wireless domain and may not be updated by an entity or application in ABXZ.com domain or ABXZ.net domain. Similarly, ABXZ.com customer's password may be updated by ABXZ.com domain and may not be updated by an entity or application in ABXZWireless.com domain or ABXZ.net domain. Similarly, ABXZ.net customer's password may be updated by ABXZ.net domain and may not be updated by an entity or application in ABXZWireless.com domain or ABXZ.com domain.

The ideal solution for unified profile may be Lightweight Directory Access Protocol ("LDAP") server to serve as a platform and not be a service layer entity. The Identity Management Tool ("IMT") may be used to manage identity relationships (e.g. linking, unlinking, and secondary ID linking request approvals). IMT may be the primary application for creating a unified profile by linking user identifications across domains.

The link requests for unified profile, when initiated in IMT, are authenticated using the data that resides locally within each domain. However, when a linked group is created in the unified profile, the common linked user identifications information and their commonly shared products and services information are stored in the unified profile. This unified profile database may be distributed across the domains in a Multi Master Replication ("MMR") or Fractional Replication ("FR") topology. This way the applications local to each domain can check the customer's user profile in the local unified profile copy and cater to the customers quickly.

Each domain may identify and capture necessary events from their respective provisioning system and update the unified profile accordingly, e.g. when customers order new service or product or cancel service(s) or change to the existing service/product. The profiles are kept up to date by the individual domains that own the specific customer profiles. Whereas unified profile that are common across the domains, are kept up to date by all the domains. For example, each of the different domains that are the master of a particular profile with an updated information, reflect this updated information in the unified profile of each of the domains. To illustrate, ABXZWireless.com, which is the master of user credential associated with the ABXZWireless domain, updates this credential in the unified profiles of the other domains if it is changed. Similarly, ABXZ.com, which is the master of user credential associated with the ABXZ.com domain, updates this credential in the unified profiles of the other domains if it is changed. Similarly, ABXZ.net, which is the master of user credential associated with the ABXZ.net domain, updates this credential in the unified profiles of the other domains if it is changed. Hence, an MMR or FR topology may be required.

The technique described here can support all existing user identifications so as not to negatively impact customers through forced ID changes and possible disruption or loss of service. For example, assume there are "duplicate" user IDes pre-existing before establishing the circle-of trust relationship across domains. These user registrations are supported "as-is" in the following manner. For example, assume a user ID 'ABC' exists in all three domains ABXZ.com, ABXZ.net and ABXZWireless.com. In one implementation, the technique described herein allows a local domain user to which the user ID is submitted have a preference over the other domain 'duplicate' user(s). When a user ID is matched at the local domain, credential matching stops with that domain. To illustrate, if user ID ABC is entered in ABXZ.com, then only ABXZ.com domain's ABC credentials are checked. Whether authentication succeeds or not, the credentials are not checked against the other two domains.

In another implementation, a specific order of authentication can be enforced. For example, if ABXZwireless.com users are given higher priority than ABXZ.com users and if the ABXZ.com users are given higher priority than ABXZ.net users, then across all domains the user credentials are matched up first against ABXZWireless.com. Only if the user ID is not found in ABXZWireless.com, the credentials are matched against ABXZ.com. If the user ID is not found in ABXZ.com, the credentials are matched against ABXZ.net.

Figure 3:
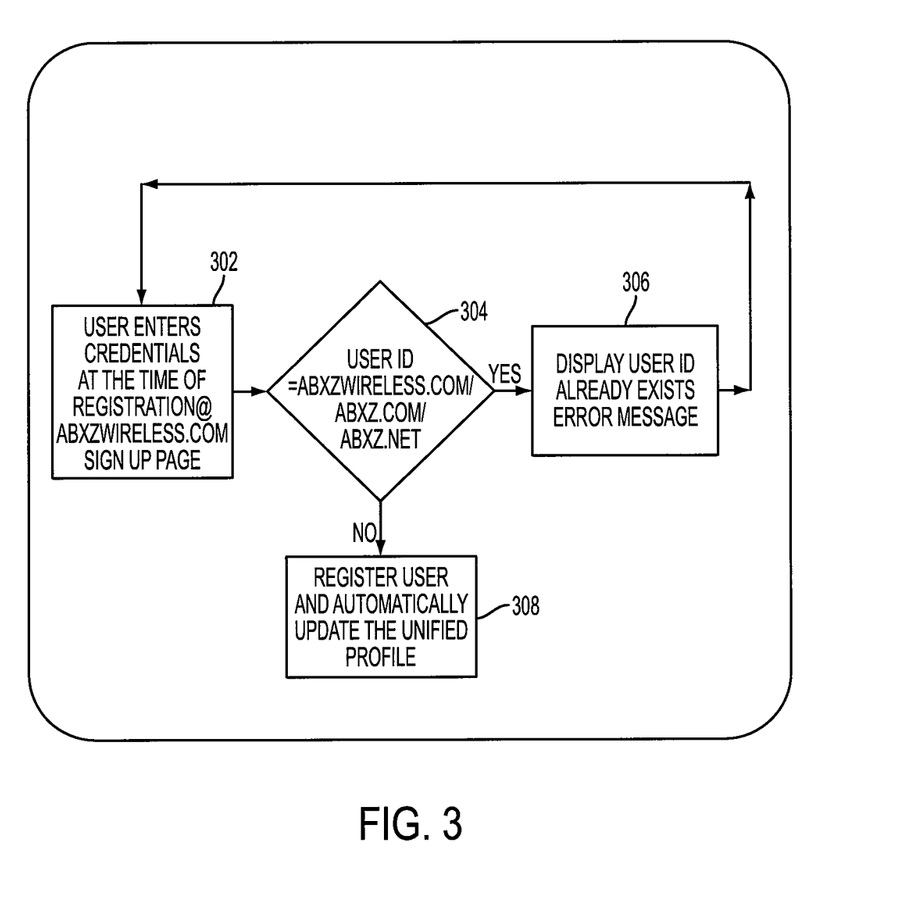
FIG. 3 illustrates an exemplary process for a new registration.

FIG. 3 illustrates an exemplary process for a new registration. In keeping with the previous example, for new registrants, the application program takes into consideration, all three ABXZ entities before issuing a new username/user ID to a new user. The process begins with the user credentials at the time of registration at ABXZ sign up page (Step 302). This page may be presented at each of the domains. In keeping with the previous example, it is assumed that the user accesses the sign up page on the ABXZ Wireless domain. The domain checks to determine whether the user credentials are already in use in any of the domains (Step 304). If yes (Step 304, Yes), the domain displays to the user an error message indicating that the user credentials already exist (Step 306). If not (Step 304, No), the domain registers the user and automatically updates the unified profile in all the domains (Step 308).

Figure 4:
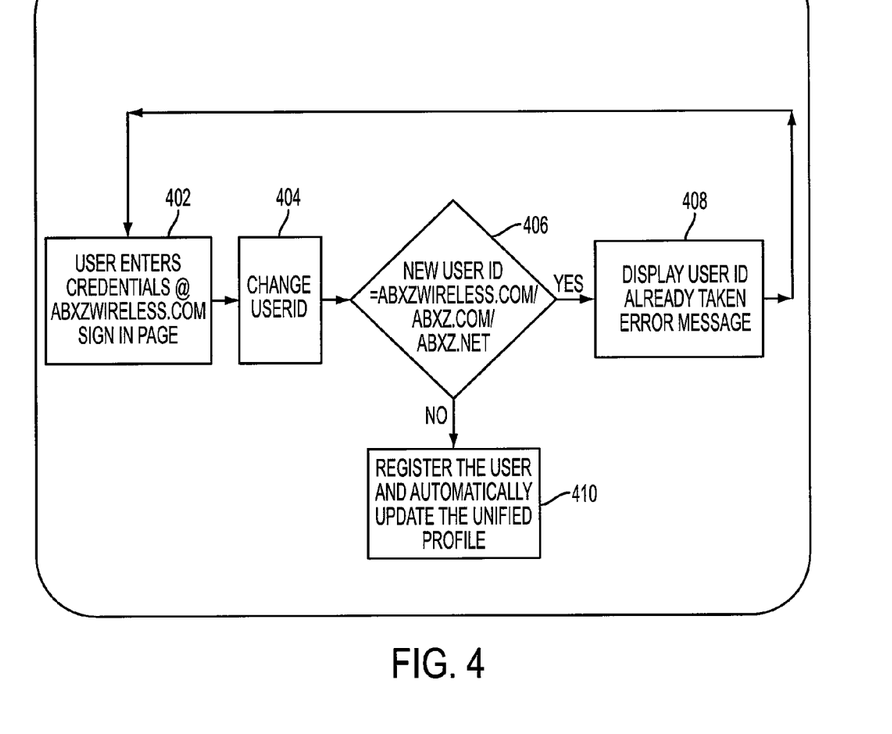
FIG. 4 illustrates an exemplary process for changing a username.

FIG. 4 illustrates an exemplary process for changing username. Similar to the previous scenario, the application program still considers all three ABXZ entities before issuing a new username/user ID to the existing user. The process begins with the user entering the credentials at ABXZ Wireless sign up page (Step 402). After successful authentication, the user may request to change his/her username (Step 404) and provides the domain with a new username. The domain receives the username and checks to determine whether the username is already in use in any of the domains (Step 406). If yes (Step 406, Yes), the domain displays to the user an error message indicating that the user credentials already exist (Step 408). If not (Step 406, No), the domain registers the user and automatically updates the unified profile in all the domains (Step 410).

As shown by the above discussion, functions for enabling access to a domain of an enterprise may be implemented on computers connected for data communication via the components of a packet data network. Although special purpose devices may be used, such devices also may be implemented using one or more hardware platforms intended to represent a general class of data processing device commonly used to run "server" programming so as to implement the seamless access to the particular domain functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for enabling the user to access a plurality of domains associated with an enterprise. The software code is executable by the general-purpose computer that functions as the server corresponding to the domains of the enterprise. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enabling the user to access the domain of the enterprise, in essentially the manner performed in the implementations discussed and illustrated herein.

Figure 5:
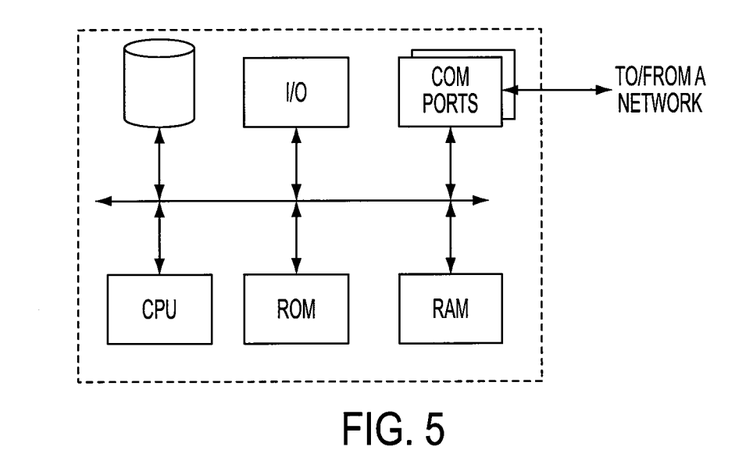
FIG. 5 is a simplified functional block diagram of a computer that may be configured as a host or server, for example, to function as one of the domains of an enterprise in the process of FIG. 1.
Figure 6:
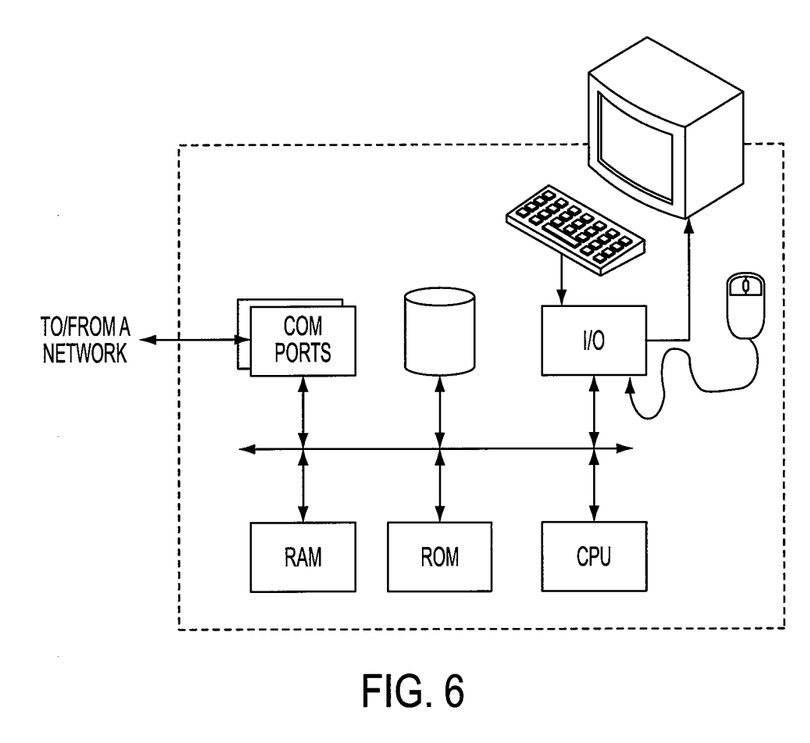
FIG. 6 is a simplified functional block diagram of a personal computer or other work station or terminal device that may be used by a user to access one of the domains of an enterprise in the process of FIG. 1.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a user terminal or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Similarly, a user terminal includes a data communication interface for packet data communication. The user terminal also includes a CPU, in the form of one or more processors, for executing program instructions. The user terminal platform typically includes an internal communication bus, program storage and data storage for various data files to be processed and/or communicated by the user terminal. The hardware elements, operating systems and programming languages of such user terminal are conventional in nature, and it is presumed that those skilled in the art are adequately familiar therewith. Of course, the user terminal functions may be implemented in a distributed fashion on a number of similar platforms, to distribute the processing load.

Hence, aspects of the methods for enabling seamless access to a plurality of enterprise domains outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, may be used to implement the process shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency ("RF") and infrared ("IR") data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is understood that various modifications may be made to the disclosed subject matter and that the disclosed subject matter may be implemented in various forms and examples, and that the teachings may be applied in numerous applications, only some of which have been described herein. For example, the pre-established credential synchronization between different domains of an entity may be kept in sync real time so that the changes in one domain is reflected in other domains in real time. Because the credentials are shared across different domains, the user can be authenticated locally which leads to a quicker authentication. The process may eliminate over the network expensive calls, which can be helpful especially if the associated systems are located across different locations.

The aforementioned technology may be built on an industry standard (e.g., data format, message structure) that is independent of specific implementation (e.g., client type or server type) and network protocols. It may provide standard security information descriptions or use existing standard security tokens. It may use a standard protocol to exchange security tokens among business partners. It may be based on the ability of the business partners to exchange information about their users in a secure way. It is intended by the following claims to claim any and all applications, modifications and variations that fall within the true scope of the present teachings.

What is claimed is:

1. A method for enabling a user to access one of a plurality of domains associated with an enterprise, the method performed by a computer and comprising steps of:

receiving, from a user and at a first domain of the enterprise, a user identification and a password;

accessing a unified profile at the first domain to identify a domain name associated with the user identification;

determining, at the first domain, whether the user identification is associated with the first domain;

upon determination that the user identification is not associated with the first domain, determining, at the first domain, whether the user identification is associated with a second domain of the enterprise;

upon determination that the user identification is associated with the second domain, authenticating, at the first domain, the user identification and the password; and upon successful authentication, enabling the user to access the second domain of the enterprise, wherein the unified profile includes all the user identifications of the enterprise and their corresponding domains, and wherein the user identification does not include a character directly reflecting a domain name.

2. The method of claim 1, wherein the user identification includes a telephone number.

3. The method of claim 1, further comprising receiving, from the second domain, updates to the unified profile stored at the first domain, the updates reflecting changes to user identifications associated with the second domain.

4. The method of claim 3, wherein the updates to the unified profile are automatically received from the second domain without an effort from the user.

5. The method of claim 1, further comprising sharing the unified profile with the second domain.

6. The method of claim 1, further comprising:
receiving, from the user, a request to change a user identification associated with the first domain;
requesting, from the user, a new user identification;
receiving, in response to the request, the new user identification;
determining whether the new user identification is registered at the first domain or the second domain; and
upon determining that the new user identification is not registered at the first and second domains, registering the new user identification for the user.

7. The method of claim 1, further comprising:
receiving, from the user, a request to change a user identification associated with the first domain;
requesting, from the user, a new user identification;
receiving, in response to the request, the new user identification;
determining whether the new user identification is registered at the first domain or the second domain; and
upon determining that the new user identification is registered at the first domain or the second domain, informing the user of to select another user identification.

8. The method of claim 7, wherein determining whether the new user identification is registered at the first or second domains includes referencing the unified profile at the first domain to determine whether the new user identification is registered at the first or second domains.

9. The method of claim 1, further comprising not authenticating the user to the first domain,
wherein enabling the user to access the second domain includes redirecting the user from the first domain to the second domain seamlessly.

10. The method of claim 1, wherein the enterprise includes a single enterprise with the first domain associated with a first line of business of the single enterprise and the second domain associated with a second line of business of the single enterprise.

11. A host system for enabling a user to access one of a plurality of domains associated with an enterprise, the host system comprising:
a processing device; and
a memory storing executable instructions configured to cause the processing device to:
receive, from a user and at a first domain of the enterprise, a user identification and a password;
access a unified profile at the first domain to identify a domain name associated with the user identification;
determine, at the first domain, whether the user identification is associated with the first domain;
upon determination that the user identification is not associated with the first domain, determine, at the first domain, whether the user identification is associated with a second domain of the enterprise;
upon determination that the user identification is associated with the second domain, authenticate, at the first domain, the user identification and the password; and
upon successful authentication, enable the user to access the second domain of the enterprise,
wherein the unified profile includes all the user identifications of the enterprise and their corresponding domains, and
wherein the user identification does not include a character directly reflecting a domain name.

12. The host system of claim 11, wherein the user identification includes a telephone number.

13. The host system of claim 11, wherein the memory further stores executable instructions configured to cause the processing device to receive, from the second domain, updates to the unified profile stored at the first domain, the updates reflecting changes to user identifications associated with the second domain.

14. The host system of claim 13, wherein the updates to the unified profile are automatically received from the second domain without an effort from the user.

15. The host system of claim 11, wherein the memory further stores executable instructions configured to cause the processing device to share the unified profile with the second domain.

16. The host system of claim 11, wherein the memory further stores executable instructions configured to cause the processing device to:
receive, from the user, a request to change a user identification associated with the first domain;
request, from the user, a new user identification;
receive, in response to the request, the new user identification;
determine whether the new user identification is registered at the first domain or the second domain; and
upon determining that the new user identification is not registered at the first and second domains, register the new user identification to the user.

17. The host system of claim 11, wherein the memory further stores executable instructions configured to cause the processing device to:
receive, from the user, a request to change a user identification associated with the first domain;
request, from the user, a new user identification;
receive, in response to the request, the new user identification;
determine whether the new user identification is registered at the first domain or the second domain; and
upon determining that the new user identification is registered at the first or the second domain, inform the user of to select another user identification.

18. The host system of claim 17, wherein determining whether the new user identification is registered at the first or second domains includes referencing the unified profile at the first domain to determine whether the new user identification is registered at the first or second domains.

19. The host system of claim 11, wherein:
the memory further stores executable instructions configured to cause the processing device to not authenticate the user to the first domain, and
wherein to enable the user to access the second domain the memory further stores executable instructions for causing the processing device to redirect the user from the first domain to the second domain seamlessly.

20. The host system of claim 11, wherein the enterprise includes a single enterprise with the first domain associated with a first line of business of the single enterprise and the second domain associated with a second line of business of the single enterprise.

21. A host system comprising:
a processing device; and
a memory storing executable instructions configured to cause the processing device to:
accept complete set of valid login credentials of a user for authentication for any of a plurality of domains of an enterprise, independent of which domain the valid login credentials were provided to, each of the plurality of domains having valid login credentials for the user; and
if the accepted valid login credentials do not match the domain to which the valid login credentials were provided, redirect the user to the domain matching the accepted valid login credentials.

22. The host system of claim 21, wherein the plurality of domains are associated with multiple lines of business of a single enterprise.

23. The host system of claim 22, wherein the memory further stores executable instructions configured to cause the processing device to access a unified profile at the domain to which the valid login credentials were provided to identify a domain name associated with the valid login credentials, wherein the unified profile includes all the login credentials and their corresponding domains of the single enterprise.

24. The host system of claim 21, wherein the memory further stores executable instructions configured to cause the processing device to prevent the user from accessing the domain to which the valid login credentials were provided after redirecting the user to the domain matching the accepted valid login credentials.

25. The host system of claim 21, wherein the memory further stores executable instructions configured to cause the processing device to allow the user to navigate back to the domain to which the valid login credentials were provided without further authentication after redirecting the user to the domain matching the accepted valid login credentials.

26. The host system of claim 21, wherein the complete set of valid credentials includes a username and password.

27. The host system of claim 21, wherein the executable instructions are further configured to cause the processing device to:
determine whether the valid login credentials submitted by the user to the domain to which the valid login credentials were provided are valid for the domain to which the valid login credentials were provided; and
if the valid login credentials are determined not to be valid for the domain to which the valid login credentials were provided, determining whether the valid login credentials are valid for any of the other domains of the enterprise,
wherein the user is redirected to the domain matching the accepted valid login credentials in response to determining that the valid login credentials are valid for another of the other domains of the enterprise.

* * * * *